United States Patent
Ulaganathan et al.

(10) Patent No.: US 10,304,455 B1
(45) Date of Patent: May 28, 2019

(54) METHOD AND SYSTEM FOR PERFORMING A TASK BASED ON USER INPUT

(71) Applicant: Wipro Limited, Bangalore (IN)

(72) Inventors: Sethuraman Ulaganathan, Tamil Nadu (IN); Manjunath Ramachandra, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 15/935,466

(22) Filed: Mar. 26, 2018

(30) Foreign Application Priority Data

Feb. 9, 2018 (IN) .............................. 201841005066

(51) Int. Cl.
| | | |
|---|---|---|
| *G10L 15/22* | (2006.01) | |
| *G05B 13/02* | (2006.01) | |
| *G06F 17/27* | (2006.01) | |
| *G05B 17/02* | (2006.01) | |
| *G10L 15/18* | (2013.01) | |
| *G10L 15/08* | (2006.01) | |

(52) U.S. Cl.
CPC ............ *G10L 15/22* (2013.01); *G05B 13/027* (2013.01); *G05B 17/02* (2013.01); *G06F 17/2785* (2013.01); *G10L 15/1815* (2013.01); *G10L 2015/088* (2013.01); *G10L 2015/223* (2013.01)

(58) Field of Classification Search
CPC combination set(s) only.
See application file for complete search history.

(56) References Cited

U.S. PATENT DOCUMENTS

| | | | |
|---|---|---|---|
| 6,829,603 B1 | 12/2004 | Chai et al. | |
| 6,999,927 B2 | 2/2006 | Mozer et al. | |
| 8,682,667 B2* | 3/2014 | Haughay | ................. G10L 15/22 704/246 |
| 8,738,617 B2* | 5/2014 | Brown | .............. G06F 17/30654 707/731 |
| 8,868,375 B1* | 10/2014 | Christian | ............. G01C 21/206 33/228 |
| 9,824,397 B1* | 11/2017 | Patel | ...................... G06Q 40/08 |

(Continued)

FOREIGN PATENT DOCUMENTS

WO 2000021074 A1 4/2000

OTHER PUBLICATIONS

Iba et al., Intention Aware Interactive Multi-Modal Robot Programming, IEEE, (2003), pp. 3479-3484.

(Continued)

*Primary Examiner* — Mamadou L Diallo
(74) *Attorney, Agent, or Firm* — Pepper Hamilton LLP

(57) ABSTRACT

Disclosed herein is a method and system for performing a task based on user input. One or more requirements related to the task are extracted from the user input. Based on the requirements, plurality of resources required for performing the task are retrieved and integrated to generate action sequences. Further, a simulated model is generated based on the action sequences and provided to the user for receiving user feedback. Finally, the action sequences are implemented based on the user feedback for performing the task. In an embodiment, the method of present disclosure is capable of automatically selecting and integrating resources required for implementing a task, thereby helps in reducing overall time required for implementing a task intended by the user.

15 Claims, 4 Drawing Sheets

(56) References Cited

U.S. PATENT DOCUMENTS

| | | | |
|---|---|---|---|
| 2009/0030800 A1* | 1/2009 | Grois | G06F 17/30864 |
| | | | 705/14.52 |
| 2017/0236337 A1* | 8/2017 | Devries | G06F 3/0304 |
| | | | 345/419 |
| 2017/0337261 A1* | 11/2017 | Wang | G06F 17/2785 |
| 2018/0052824 A1* | 2/2018 | Ferrydiansyah | G06F 17/2785 |
| 2018/0075168 A1* | 3/2018 | Tiwari | G06F 17/5004 |
| 2018/0090143 A1* | 3/2018 | Saddler | G10L 15/1815 |
| 2018/0196683 A1* | 7/2018 | Radebaugh | G06F 17/30864 |
| 2018/0247648 A1* | 8/2018 | Nadimpalli | G10L 15/22 |

OTHER PUBLICATIONS

"Where is an Editing Program with Automated Speech Recognition?", https://forums.creativecow.net/thread/335/86413 (2015).

* cited by examiner

METHOD AND SYSTEM FOR PERFORMING A TASK BASED ON USER INPUT

This application claims the benefit of Indian Patent Application Serial No. 201841005066 filed Feb. 9, 2018, which is hereby incorporated by reference in its entirety.

FIELD

The present subject matter is, in general, related to artificial intelligence and more particularly, but not exclusively, to a method and system for performing a task based on user input.

BACKGROUND

Advancement of technology and use of modern programming languages have helped programmers, to an extent, to write programs for any problem or individual technical task with less effort. However, programming itself is a resource intensive process, and programmers need to spend lot of time and efforts in writing programs to control multiple devices used for accomplishing a common task. Additionally, implementation and validation of the programs is also a tedious task for the programmers.

Presently, there are systems which can understand dedicated speech terms and technical word utterances from a user query to perform a specified task. However, most of these systems fail to understand user's intent in the user query, due to their limited capabilities in terms of dialog processing. Consideration of the user's intent is a crucial aspect for designing and implementing the tasks specified by the user, in order to exactly match with the requirements of the user.

The information disclosed in the background section of the disclosure is only for enhancement of understanding of the general background of the invention, and should not be taken as an acknowledgement or any form of suggestion that this information forms the prior art already known to a person skilled in the art.

SUMMARY

Disclosed herein is a method for performing a task based on user input. The method comprises extracting, by a task management system, one or more requirements from the user input. The user input corresponds to the task intended by a user. Further, the method comprises retrieving plurality of resources required for performing the task based on the one or more requirements. Upon retrieving the plurality of resources, the method comprises generating one or more action sequences for performing the task by integrating each of the plurality of resources. Further, the method comprises providing a simulated model, generated based on one of the one or more action sequences, to the user for receiving one or more user feedback. Finally, the method comprises implementing the one of the one or more action sequences based on the one or more user feedback for performing the task.

Further, the present disclosure relates to a task management system for performing a task based on user input. The task management system comprises a processor and a memory. The memory is communicatively coupled to the processor and stores processor-executable instructions, which on execution, cause the processor to extract one or more requirements from the user input. The user input corresponds to the task intended by a user. Further, the instructions cause the processor to retrieve plurality of resources required for performing the task based on the one or more requirements. Upon retrieving the plurality of resources, the instructions cause the processor to generate one or more action sequences for performing the task by integrating each of the plurality of resources. Further, the instructions cause the processor to provide a simulated model, generated based on one of the one or more action sequences, to the user for receiving one or more user feedback. Finally, the instructions cause the processor to implement the one of the one or more action sequences based on the one or more user feedback for performing the task.

Furthermore, the present disclosure relates to a non-transitory computer readable medium including instructions that when processed by at least one processor causes a task management system to perform operations comprising extracting one or more requirements from the user input, wherein the user input corresponds to the task intended by a user. The operations further comprise retrieving plurality of resources required for performing the task based on the one or more requirements. Once the plurality of resources are retrieved, the instructions causes the processor to generate one or more action sequences for performing the task by integrating each of the plurality of resources. Thereafter, the instructions causes the processor to provide a simulated model, generated based on one of the one or more action sequences, to the user for receiving one or more user feedback and implementing the one of the one or more action sequences based on the one or more user feedback for performing the task.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

Figure 1:
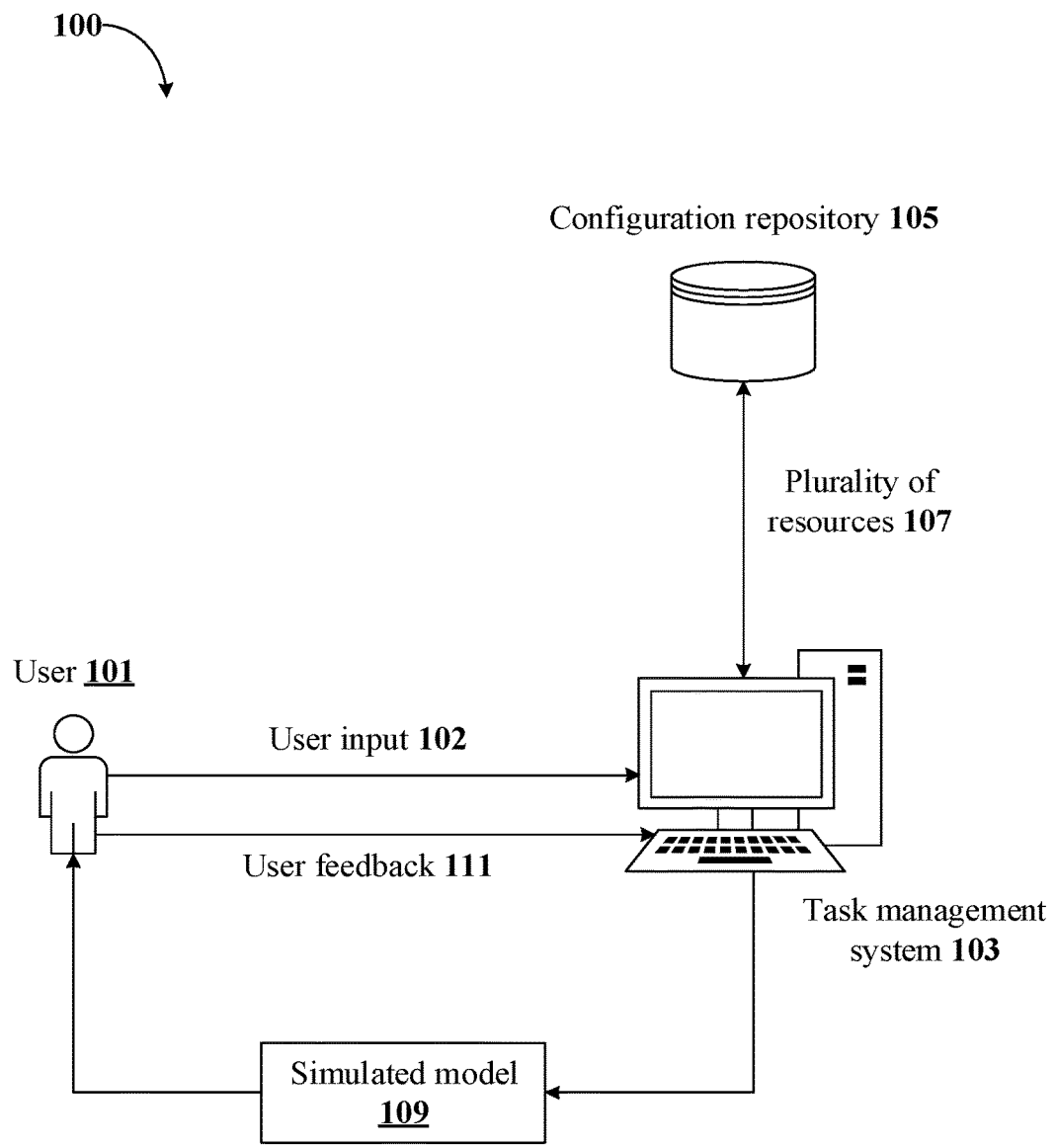
FIG. 1 illustrates an exemplary environment for performing a task based on user input in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the spirit and the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a task management system for performing a task based on user input. In an embodiment, the task management system of the present disclosure may be construed as a Natural Language Processing (NLP) based user dialog processing system used for implementing a task intended by a user. More particularly, the method of present disclosure uses the NLP based speech-to-text conversion techniques to understand user intention. Further, based on user dialog and/or narration interpretation, a workflow or action sequences are generated to carry out the task intended by the user.

In an embodiment, while carrying out implementation of the task intended by the user, the task management system may interact with the user to get confirmation about one or more automated integration modules selected for implementing the task intended by the user. The one or more automated integration modules may include one or more integrated resources required for implementing the task intended by the user. Further, once the action sequences are created for the task intended by the user, the task management system may virtually execute the one or more integrated resources and notify results to the user for receiving user confirmation. This allows the users to put forward additional requirements or confirm the formulated action sequences.

In an embodiment, when the user suggests additional actions for the task intended by the user, the task management system may re-integrate the one or more automated integration modules to include the additional user requirements. Subsequently, a virtual working model of a re-integrated design of the one or more automation integration modules may be displayed to the user to fine-tune parameters and thereby providing a realistic experience to the user.

In an embodiment, based on the final confirmation from the user, the workflows, system modules comprising of the hardware components, software modules, data and interventions are selected and connected in a specific order to enable smooth transfer of data and actions across the modules. Further, the task management system may use predefined modules of different connected devices, and integrate those modules in a specific way, which may be aligned with the user intention. Additionally, the creation of action sequences and their execution may be performed based on user-specified languages and other rule based conditions, thereby providing flexibility and complete control over the implementation of tasks to the user.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an exemplary environment 100 for performing a task based on user input 102 in accordance with some embodiments of the present disclosure.

The environment 100 may include a user 101, a task management system 103, and a configuration repository 105. The task management system 103 may be configured to receive a user input 102 from the user 101. In an embodiment, the user input 102 may be an input in natural language format. As an example, the user input 102 may include, without limiting to, one or more words/sentences uttered by the user 101, a dialog/conversation between the user 101 and the task management system 103, or a text document comprising the user input 102 in the textual format. Further, the user input 102 may include one or more requirements related to a task intended by the user 101.

In an embodiment, upon receiving the user input 102 from the user 101, the task management system 103 may analyse the user input 102 and extract the one or more requirements from the user input 102. The one or more requirements may be related to the task intended by the user 101. For example, if the task intended by the user 101 is to 'paint a wall', then the one or more requirements related to the task intended by the user 101 may include colour of the paint, thickness of paint coating and the like.

Upon extracting the one or more requirements from the user input 102, the task management system 103 may retrieve plurality of resources 107 required for performing the task based on the one or more requirements. As an example, the plurality of resources 107 may include one or more software modules and one or more hardware components required for implementing the task intended by the user 101. In the above example, the one or more software modules related to the task, i.e., "paint a wall, may include, without limitation, paint spray control module, image capturing module, drone flight control module, navigation module and the like. Similarly, the one or more hardware components related to the task may include, without limitation, paint, drone, image capturing devices, sprayers and the like.

In an implementation, the plurality of resources 107 may be retrieved from the configuration repository 105 associated with the task management system 103. As an example, the configuration repository 105 may be virtual computing environment or a cloud based computing environment that stores a collection of one or more software modules and information related to one or more hardware components, which may be integrated in specific configuration to implement the tasks intended by the user 101.

In an embodiment, upon retrieving the plurality of resources 107 from the configuration repository 105, the task management system 103 may generate one or more action sequences for performing the task intended by the user 101. As an example, the one or more action sequences may include, without limiting to, one or more tasks that need to be implemented in a specific sequence for implementing the task intended by the user 101. In an embodiment, the task management system 103 may generate the one or more action sequences by integrating each of the plurality of resources 107 based on one or more parameters including, without limiting to, a predetermined reference integration design, historical data related to similar tasks, metadata associated with one or more software modules and one or more hardware components, nature of the user input 102, and hypothetical analysis related to the task.

Upon generating the one or more action sequences, the task management system 103 may use the one or more action sequences to generate a simulated model 109. The simulated model 109 may be a virtual representation of the task intended by the user 101, which may be obtained based on implementation of the one or more action sequences. In an embodiment, the task management system 103 may provide the simulated model 109 to the user 101 for receiving one or more user feedback 111 on the simulated model 109. As an example, the one or more user feedback 111 provided by the user 101 may include, without limitation, one or more modifications for the one of the one or more action sequences, or an approval for implementing the one of the one or more action sequences.

In an embodiment, when the one or more user feedback 111 may include one or more modifications to the one or more action sequences, the task management system 103 may incorporate each of the one or more modifications suggested by the user 101 to the one or more action sequences, and re-generate the simulated model 109 by re-integration of the plurality of resources 107. Alternatively, when the one or more user feedback 111 may include the approval for implementation, the task management system 103 may implement each of the one or more action sequences for performing the task intended by the user 101. In an embodiment, the task management system 103 may implement the one or more action sequences only upon receiving the user 101 approval for the simulated model 109. Thus, the task management system 103 may ensure that the actual implementation of the one or more action sequences meets the one or more requirements related to the task intended by the user 101.

Figure 2:
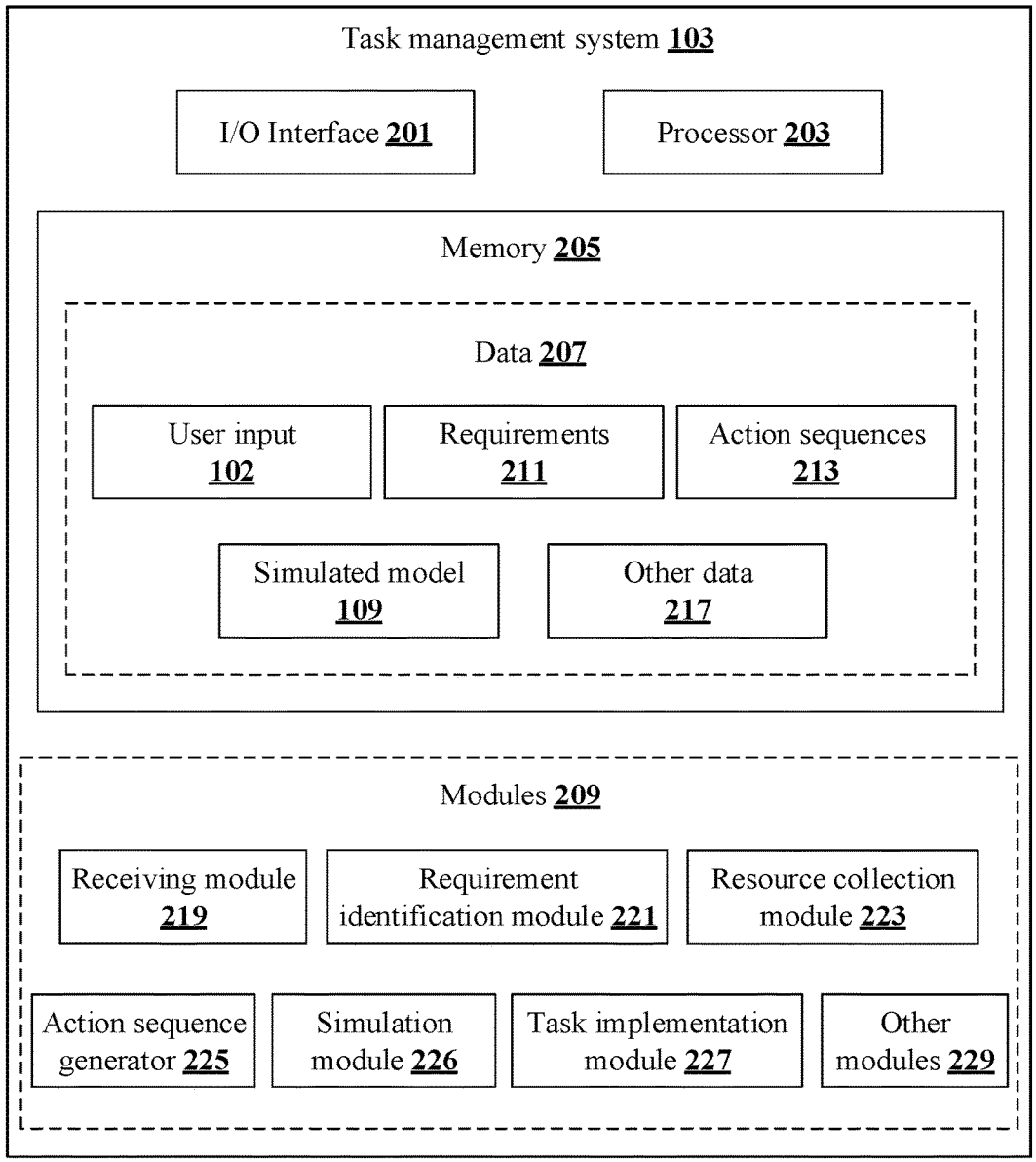
FIG. 2 shows a detailed block diagram illustrating a task management system in accordance with some embodiments of the present disclosure.

FIG. 2 shows a detailed block diagram illustrating a task management system 103 in accordance with some embodiments of the present disclosure.

In an implementation, the task management system 103 may include an I/O interface 201, a processor 203, and a memory 205. The I/O interface 201 may be configured to communicate with a user 101, through one or more electronic devices and/or one or more user interfaces associated with the user 101, for receiving a user input 102 from the user 101. Further, the I/O interface 201 may be used to provide a simulated model 109 of the task to the user 101 for receiving one or more user feedback 111 from the user 101. The memory 205 may be communicatively coupled to the processor 203. The processor 203 may be configured to perform one or more functions of the task management system 103 for performing the task based on the user input 102.

In some implementations, the task management system 103 may include data 207 and modules 209 for performing various operations in accordance with the embodiments of the present disclosure. In an embodiment, the data 207 may be stored within the memory 205 and may include information related to, without limiting to, the user input 102, one or more requirements 211, one or more action sequences 213, a simulated model 109, and other data 217.

In some embodiments, the data 207 may be stored within the memory 205 in the form of various data structures. Additionally, the data 207 may be organized using data models, such as relational or hierarchical data models. The other data 217 may store data, including the one or more user feedback 111, and other temporary data and files generated by one or more modules 209 for performing various functions of the task management system 103.

In an embodiment, the user input 102 may be a natural language input received from the user 101. The user input 102 may be received in various formats such as voice, text, or gestures and/or facial expressions of the user 101. Further, the user input 102 may include one or more requirements 211 related to the task intended by the user 101. For example, when the user 101 wants the task management system 103 to paint a wall in front of the user 101, the user input 102 provided by the user 101 may be an utterance such as—'paint the wall in front of me with Red'. Here, the task is to 'paint the wall', and the requirement is to select 'Red' paint for painting the wall.

In an embodiment, the one or more action sequences 213 may be a sequence of actions which need to be performed in order to implement a task intended by the user 101. As an example, the one or more action sequences 213 may include information related to inputs to the plurality of resources 107, specific configuration and interaction among the plurality of resources 107 and the like. In an embodiment, the one or more action sequences 213 may be generated by integrating each of the plurality of resources 107 that are retrieved from the configuration repository 105. Further, the one or more action sequences 213 may be dynamically updated to incorporate one or more modifications and/or additional requirements 211 specified by the user 101.

For example, consider a scenario in which the user 101 requests the task management system 103 to paint a wall. In the above scenario, the one or more action sequences 213 generated by the task management system 103 may include various intermediate actions that are required to be performed for painting the wall, for example, as illustrated below:

Action 1: Extract the requirements 211;

For example, the requirements 211 may include location of the wall, color of the paint, number of coatings, and the like.

Action 2: Determine the plurality of resources 107 required for painting the wall;

For example, the plurality of resources 107 required for paining the wall may include a robot or a drone, a controller for controlling the movement of robot/drone, paint, paint brush/roller and the like.

Action 3: Retrieve the plurality of resources 107;

Action 4: Generate a simulated model 109 of 'painting the wall', and provide it to the user 101 for receiving the user feedback 111;

For example, one of the user feedback 111 may be to change the color of paint being used for painting the wall.

Action 5: Finalize the simulated model 109 based on the user feedback 111;

Action 6: Fetch the plurality of resources 107 and generate an integrated working model of the task (i.e. painting the wall);

At this stage, the task management system 103 may gather actual resources from various sources for designing a real-time, working model of the task.

Action 7: Implement the integrated working model for painting the wall, as intended by the user;

Action 8: Accept real-time user feedback 111 from the user 101 while painting the wall. For example, the user feedback 111 may be:

To adjust size of nozzle based on thickness of the paint.

Configure the drone/robot for painting boundaries, and specific locations and the like.

In an embodiment, the simulated model 109 may be a virtual representation of an implemented instance of the one or more action sequences 213.

In other words, the simulated model 109 may enable the user 101 to experience implementation of the task even before the task may be implemented in reality. For example, the simulated model 109 generated for the task—'painting the wall', may enable the user 101 to view/experience a drone painting a wall with Red paint. Thus, the simulated model 109 helps in validating the one or more action sequences 213 even before they are implemented in reality. Due to which, usage of resources of the processor 203 may be reduced in comparison to the resources required for executing the one or more action sequences 213 multiple times, in reality, to perform the task as intended by the user 101.

In an embodiment, each of the data 207 stored in the task management system 103 may be processed by one or more modules 209 of the task management system 103. In one implementation, the one or more modules 209 may be stored as a part of the processor 203. In another implementation, the one or more modules 209 may be communicatively coupled to the processor 203 for performing one or more functions of the task management system 103. The modules 209 may include, without limiting to, a receiving module 219, a requirement identification module 221, a resource collection module 223, an action sequence generator 225, a simulation module 226, a task implementation module 227 and other modules 229.

As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. In an embodiment, the other modules 229 may be used to perform various miscellaneous functionalities of the task management system 103. It will be appreciated that such modules 209 may be represented as a single module or a combination of different modules.

The receiving module 219 may be used for receiving the user input 102 from the user 101. In an embodiment, the receiving module 219 may be associated with various input capturing devices such as a microphone for capturing the voice based inputs, and an image capturing unit for capturing movements/facial expressions/gestures made by the user 101, during conversation/dialog between the user 101 and the task management system 103.

In an embodiment, the requirement identification module 221 may be used for processing the user input 102 received from the user 101 for extracting the one or more requirements 211 from the user input 102. In an implementation, the requirement identification module 221 may function as a text parser, which is capable of parsing the user input 102 to identify one or more task-specific keywords, and other objects of interest in the user input 102. Specifically, the one or more objects of interest that relate to verbs (actions) and objects (on which the actions are being performed) may be extracted from the user input 102. For example, suppose the user input 102 is a query such as—"How do I develop a system to paint the walls?". Here, the phrase "to paint" may be considered as a verb, and the word "wall" may be considered as the object of interest.

Further, the requirement identification module 221 may associate an action frame for each of the one or more task-specific keywords extracted from the user input 102, for storing all information relevant to the one or more task-specific keywords. In an embodiment, the action frame may have one or more fields, which needs to be populated based on information relevant to the one or more task-specific keywords in the user input 102. For example, when the user input 102 is—'paint the wall', an action frame may be invoked for the identified task-specific keyword which is "paint". Further, the action frame may have multiple fields such as colour of the paint, location of the wall (determined using a Global Positioning System (GPS) sensor and/or using gestures made by the user 101, relative to current position of the user 101), thickness of paint coating, location where the paint is available and the like. In an embodiment, the one or more fields of the action frame may be populated during the course of dialog/conversation between the user 101 and the task management system 103.

In an embodiment, if any of the one or more fields of the action frame are missing, then the requirement identification module 221 may trigger a query to the user 101 for providing missing information related to the action frame, until all the fields of the action frame are completely filled with relevant information. Further, when a new requirement may have to be added into the task, the requirement identification module 221 may define a new action frame for collecting information related to the new requirement. The above process may be performed during training and development of the task management system 103.

In an embodiment, the resource collection module 223 may be used for retrieving the plurality of resources from the configuration repository 105 based on the one or more requirements 211 extracted from the user input 102. The resource collection module 223 may analyse each of the one or more task-specific keywords in the one or more requirements 211 to pick up the one or more software modules and the one or more hardware components required for implementing the one or more requirements 211. Further, when a particular resource may not be available in the configuration repository 105, the resource collection module 223 may identify one or more alternative resources and notify the user 101 about availability of the alternative resources. For example, for the task of painting, the alternatives may be selected among drones, human beings and robots.

In an embodiment, upon identifying and locating each of the plurality of resources 107, the resource collection module 223 may determine task-specific attributes of the plurality of resources 107 for an effective integration among the plurality of resources 107. For example, in case of 'painting the wall' task, the 'Drone' resource must be able to carry paint to the location of the wall for painting the wall. Hence, the task-specific attributes of the resource 'Drone' may include a paint carrier for carrying the paint, a spray nozzle for spraying the colour on the wall, and a control software for controlling movement of the drone, and the spray nozzle. In an embodiment, each of the plurality of resources 107 may be configured according to the task-specific attributes, before they are retrieved onto the task management system 103.

In an embodiment, the action sequence generator 225 may be used for generating the one or more action sequences 213 for performing the task by integrating each of the plurality of resources 107. Initially, the action sequence generator 225 may determine events that include information related to the one or more hardware components, the one or more software modules, one or more inputs/triggers to the plurality of resources 107, data associated with the plurality of resources 107 and the like. Subsequently, the action sequence generator 225 may integrate the plurality of resources 107 based on the events for generating the one or more action sequences 213.

In an embodiment, the action sequence generator 225 may integrate the plurality of resources 107 in accordance with following one or more parameters:

A predetermined reference integration design provided by the user 101, or obtained from external resources such as Internet.

Historical data related to the one or more similar tasks, and similar requests received from the user 101 in the past.

Metadata associated with the plurality of resources 107. The metadata may be useful in deciding various aspects such as where to get the input for the plurality of resources 107, where to connect output of the plurality of the resources, and sequence of actions happening within the plurality of resources 107.

Nature of the input to the plurality of resources 107. For example, it may be appropriate to integrate a resource that accepts a 'video' as the input with an image/video capturing resource.

Hypothetical analysis and/or reason based analogies related to the task. In an embodiment, a set of hypotheses may be generated around each sentence and/or each task-specific keyword uttered by the user 101 for building an effective action sequence. For example, if user 101 says—'I want to paint the walls', then the hypothetical analysis of utterance of the user 101 reveals that the paint should reach the wall. Hence, for generating the action sequence, different ways of reaching the wall may be determined. For example, in the above case, the hypothetical analysis indicates that the wall may be reached with the help of a ladder, an aeroplane, a rocket, helicopter or a drone. However, the drone may be used for the purpose as the drones are small and economical in nature.

In an embodiment, the action sequence generator 225 may generate more than one action sequences 213 for the same task. However, one of the multiple action sequences 213 may be chosen for implementing the task based on cost associated with each of the one or more action sequences 213. For example, in case of the painting task, the costs per resource per addition of each layer of coating of the paint may be an important criteria for deciding an optimal action sequence. Further, if an action sequence includes execution loops, then the cost may have to be multiplied multiple times. Hence, selection of one of the action sequence among the one or more action sequences is important, and the selection may be made based on various parameters such as a cost function associated with each of the plurality of resources 107, time required/taken for execution of the action sequence, and its computational complexity.

In an embodiment, the simulation module 226 may be responsible for generating the simulated model 109 of the task by implementing one of the one or more action sequences 213 selected for implementing the task. The simulation module 226 may connect each of the plurality of resources 107 via simulations for building the task intended by the user 101. Further, expected behavior and features of the one or more hardware components may be used in the simulated model 109 before providing the simulated model 109 for the user 101. Finally, during actual deployment of the task, the user 101 may be advised to replace the plurality of resources 107, specifically, the one or more hardware components used in the simulated model 109, with actual resources.

In an embodiment, the simulated model 109 generated by the simulation module 226 may be provided and/or rendered to the user 101 using an appropriate Virtual Reality (VR) based technique. For example, the user 101 may be advised to wear a VR headgear or suitable VR gadget to experience the simulated model 109. This allows the user 101 to point to any object in the simulated model 109 and ask queries or suggest modifications for the object in the form of the user feedback 111.

In an implementation, the user feedback 111 may be provided through a user interface associated with the task management system 103 and may include a conversation with the task management system 103. The user feedback 111 may involve fine-tuning of values in the action frames or configuration files of the plurality of resources 107. For example, while painting the wall, the user 101 may want the coating to be dark where the wall is directly exposed to sunlight. The specific requirements 211 like these may be indicated to the task management system 103 for fine-tuning the implementation of the task.

In an embodiment, the simulation module 226 may re-generate the simulated model 109 each time the user 101 suggests one or more modifications or specifies a new requirement in the simulated model 109 and provide a modified simulated model 109 to the user 101 for validating the simulated model 109, thus modified. Finally, upon receiving the user 101 approval for the simulated model 109, a task specific profile may be created and stored in the task management system 103 for using it at the time of actual deployment of the selected action sequence.

In an embodiment, the task implementation module 227 may be used for performing actual implementation of the task, upon successful validation of the simulated model 109. The implementation module may be responsible for integrating and deploying the plurality of resources 107 based on configurations used in the simulated model 109. Further, when the plurality of resources 107 required for implementing the task are not available at the task management system 103, one or more service providers may be contacted for supplying each of the plurality of resources 107. In an implementation, consumable resources such as paint, water and the like, may be provided by the user 101.

In an embodiment, the user 101 may be allowed to monitor the implementation of the task, when the task is being executed. Here, the user 101 may view results in real-time and instruct minor modifications in the implementation process through the user interface or through voice-based commands system. The modifications, thus received in real-time, may be incorporated to the implementation process in real-time. For example, if a cleaning robot is not cleaning the painted area properly or is unable to differentiate what to retain and what to discard, the user 101 may provide feedback for fine-tuning the operation of the cleaning robot.

In an embodiment, task management system 103 may be capable of self-learning the one or more modifications suggested by the user 101 during validation of the simulated model 109 or implementation of the task, using a plurality of techniques such as deep reinforcement learning, reinforcement learning and the like. Accordingly, the task specific profiles stored on the task management system 103 may be updated and stored as a reference for implementation of future tasks.

Use Case Scenario—1:

Suppose, a user A wants to develop a system to paint a wall. The user A may use the task management system 103 of the present disclosure for implementing the task by invoking an application, such as a mobile application of the task management system 103. The application may open into a User Interface [UI] that allows the user A to select painting application. Once the user A selects the painting application, corresponding conversation engine in the task management system 103 may start a conversation with the user A to know the one or more requirements 211 of the user A. Further, the user A may describe his requirements 211 viz., color of the paint, thickness of coating, and the like. In some instances, the task management system 103, through the UI, may interrupt the user A and prompt the user A to provide any missing information that may be necessary for implementing the task. For example, the task management system 103 may prompt the user A to specify the location of the wall.

Subsequently, upon understanding the requirements 211 of the user A, the task management system 103 may choose the plurality of resources 107, integrate them together into a simulated model 109, and render the simulated model 109 to the user A to get the feedback from user A. If the user A accepts how the wall looks after painting, the user may give an approval and/or an execution command. Thereafter, a service provider associated with the task management system 103 may send the required resources to the location of the wall for painting the wall. Alternatively, suppose if the user A does not like the color of the paint as seen in the simulated model 109, then the user A may provide user feedback 111 for suggesting a correction in the color of paint, through the UI. Based on the user feedback 111, the task management system 103 may regenerate the simulated model 109 and render it to the user A for his approval.

Use Case Scenario—2:

Consider a scenario wherein, a user B wants to find all photos in which he is present from a database of photos. The user B may instruct the same to the task management system 103, by invoking an application, such as a mobile application of the task management system 103. Based on user instruction, the task management system 103 may retrieve an appropriate face detection technique from a set of techniques available on the configuration repository 105. Subsequently, the task management system 103 may generate a workflow, which includes various activities such as face detection, and sorting of images of interest to a folder, using the action sequence generator 225.

Further, suppose the user B instructs the task management system 103 to separate all the images, in which his new car is seen from all other photos stored on the database of photos. Here, the workflow generated by the action sequence generator 225 may be slightly modified. For example, in the above scenario, the task management system 103 may retrieve a Convolutional Neural Network (CNN) based object detection technique from the configuration repository 105, for detection of the car object in the photos. Subsequently, all the photos having new car of the user B may be segregated and provided to the user B. Thus, the task management system 103 is capable of automatically selecting appropriate resources and techniques required for implementing a task intended by the user B.

Figure 3:
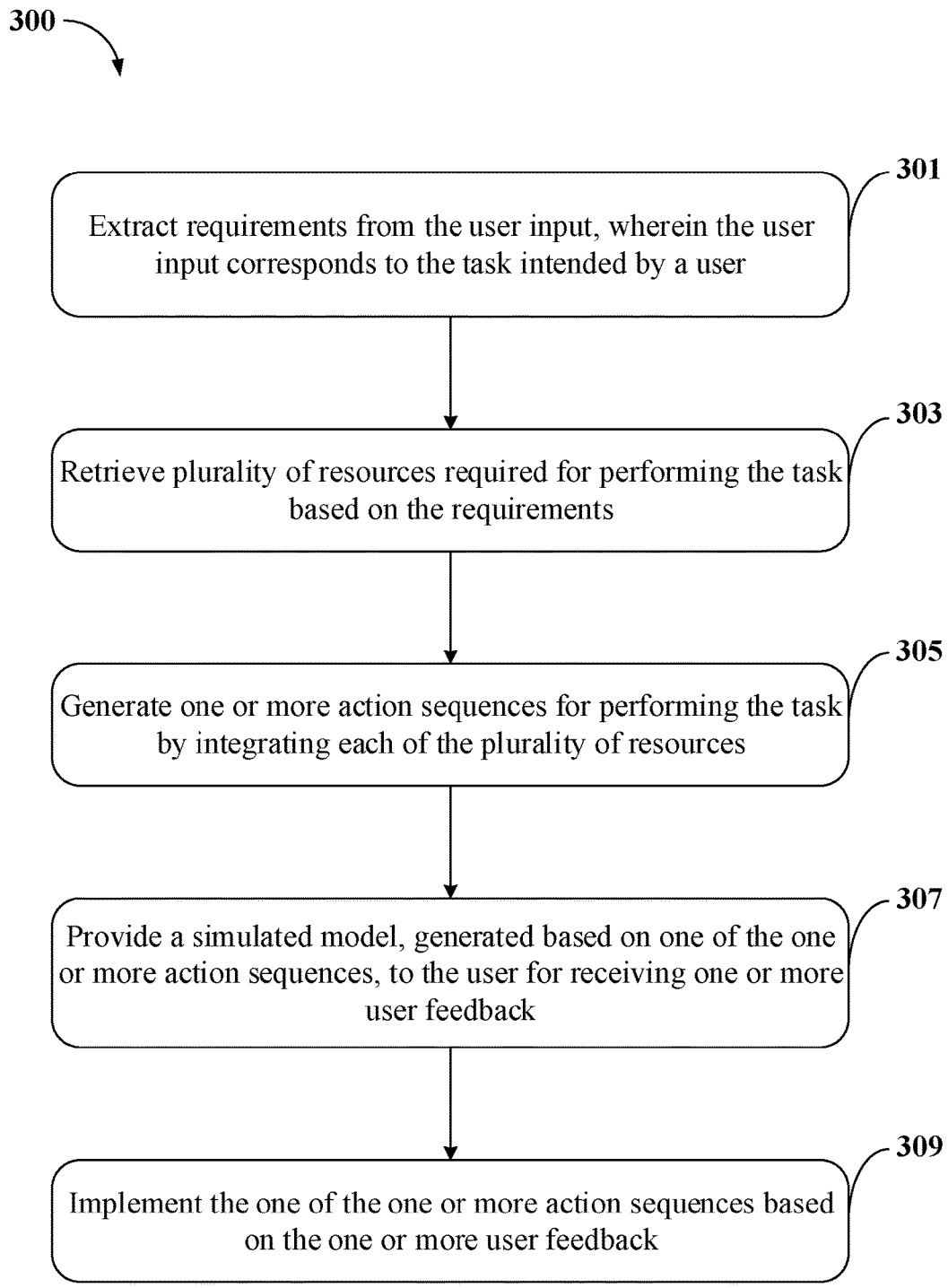
FIG. 3 shows a flowchart illustrating a method of performing a task based on user input in accordance with some embodiments of the present disclosure.

FIG. 3 shows a flowchart illustrating a method of performing a task based on user input 102 in accordance with some embodiments of the present disclosure.

As illustrated in FIG. 3, the method 300 includes one or more blocks illustrating a method of performing a task based on user input 102 using a task management system 103 for example, the task management system 103 shown in FIG. 1. The method 300 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, the method 300 includes extracting, by the task management system 103, one or more requirements 211 from the user input 102. In an embodiment, the user input 102 may correspond to the task intended by a user 101. As an example, the user input 102 may be at least one of a voice input and a text input.

In an embodiment, the one or more requirements 211 may be extracted from the user input 102 by capturing one or more task-specific keywords from the user input 102. Subsequently, each of the one or more task-specific keywords may be mapped with one or more predetermined action frames for identifying one or more missing information in the user input 102. In an embodiment, the user 101 may be prompted for providing the one or more missing information.

At block 303, the method 300 includes retrieving, by the task management system 103, plurality of resources 107 required for performing the task based on the one or more requirements 211. In an embodiment, the plurality of resources 107 may include one or more software modules and one or more hardware components, retrieved from a configuration repository 105 associated with the task management system 103.

At block 305, the method 300 includes generating, by the task management system 103, one or more action sequences 213 for performing the task by integrating each of the plurality of resources 107. In an embodiment, each of the plurality of resources 107 may be integrated based on one or more parameters including a predetermined reference integration design, historical data related to similar tasks, metadata associated with one or more software modules and one or more hardware components, nature of the user input 102, and hypothetical analysis related to the task.

At block 307, the method 300 includes providing, by the task management system 103, a simulated model 109 to the user 101 for receiving one or more user feedback 111. In an embodiment, the simulated model 109 may be generated by implementing the one of the one or more action sequences 213 in a virtual environment. As an example, the one of the one or more action sequences 213 may be selected based on predetermined factors such as costs associated with the one or more action sequences 213.

At block 309, the method 300 includes implementing, by the task management system 103, the one of the one or more action sequences 213 based on the one or more user feedback 111 for performing the task. As an example, the one or more user feedback 111 may include one or more modifications for the one of the one or more action sequences 213, or an approval for implementing the one of the one or more action sequences 213. In an embodiment, the task management system 103 may incorporate each of the one or more modifications to the one of the one or more action sequences 213 before implementing the one of the one or more action sequences 213.

Computer System

Figure 4:
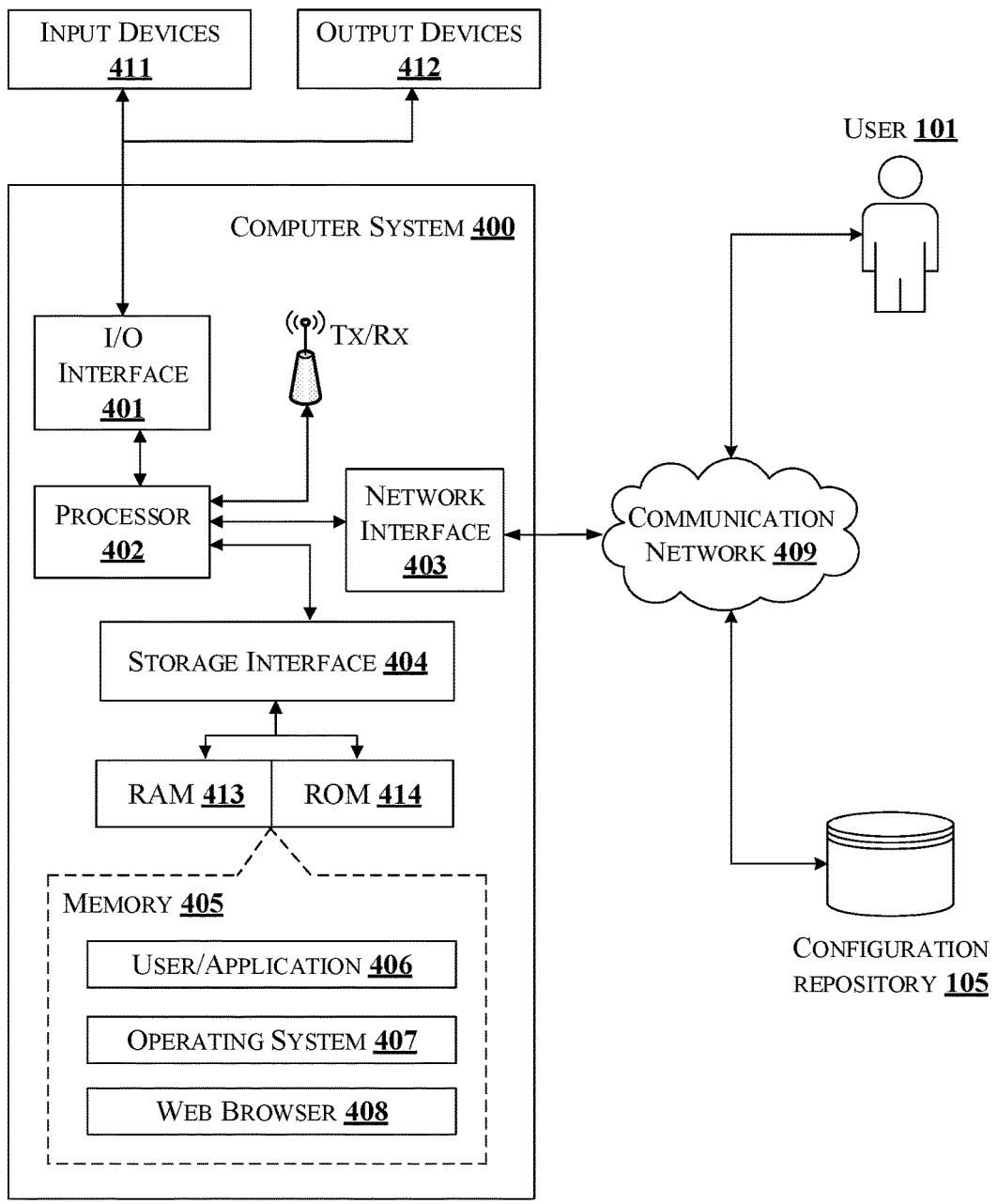
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 may be task management system 103, which may be used for performing a task based on user input 102. The computer system 400 may include a central processing unit ("CPU" or "processor") 402. The processor 402 may comprise at least one data processor for executing program components for executing user- or system-generated business processes. A user 101 may include a person, a user 101 in the computing environment 100, or any system/subsystem being operated parallel to the computer system 400. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 401, the computer system 400 may communicate with one or more I/O devices 411 and 412. In some implementations, the I/O interface 401 may be used to connect to a user device, such as a smartphone, a laptop, or a desktop computer associated with the user 101, through which the user 101 interacts with the task management system 103.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with the user 101 to receive user input 102 and/or user feedback 111 from the user 101. Further, the communication network 409 may be used to connect to a configuration repository 105 associated with the computer system 400 to retrieve plurality of resources 107 required for performing the task.

The communication network 409 can be implemented as one of the several types of networks, such as intranet or Local Area Network (LAN) and such within the organization. The communication network 409 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc.

In some embodiments, the processor 402 may be disposed in communication with a memory 405 (e.g., RAM 413, ROM 414, etc. as shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application 406, an operating system 407, a web browser 408, and the like. In some embodiments, computer system 400 may store user/application data 406, such as the data, variables, records, etc. as described in this invention. Such databases may be implemented as fault-tolerant, relational, scalable, secure databases such as Oracle® or Sybase®.

The operating system 407 may facilitate resource management and operation of the computer system 400. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT® WINDOWS™ (XP™, VISTA™/7/8, 10 etc.), APPLE® IOS™, GOOGLE® ANDROID™, BLACKBERRY® OS, or the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the embodiment of the present disclosure are illustrated herein.

In an embodiment, the present disclosure discloses a method for performing tasks intended by the user based on user input, which is in the form of natural language.

In an embodiment, the method of present disclosure is capable of automatically selecting right kind of resources for accomplishing the tasks intended by the user.

In an embodiment, the method of present disclosure is capable of dynamically translating a natural language dialogue description into a machine-level solution for implementing the tasks intended by the user.

In an embodiment, the method of present disclosure generates multiple action sequences, and dynamically selects an optimal action sequence among the multiple action sequences for implementing the task, thereby reducing costs associated with the implementation of the tasks intended by the user.

In an embodiment, the method of present disclosure helps in reducing overall time required by a skilled professional for designing and implementing a task.

In an embodiment, the present disclosure generates a simulated model, prior to actual implementation of the task, due to which usage of resources of processor may be reduced in comparison to the resources required by the processor for executing the task multiple times in reality to perform the task as intended by the user.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise. The enumerated listing of items does not imply that any or all the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   extracting, by a task management system, by natural language processing one or more requirements from intent in user input data that corresponds to a task;
   retrieving, by the task management system, a plurality of resources comprising one or more software modules and one or more hardware components from a configuration repository required for performing the task based on the one or more requirements;
   generating, by the task management system, one or more automated action sequences for performing the task by integrating each of the one or more software modules and the one and more hardware components;
   providing, by the task management system, a simulated model generated based on one of the one or more action sequences to validate the one of the one or more action sequences in a virtual environment, wherein the simulated model of the one of the one or more action sequences is regenerated in the virtual environment based on received user feedback data comprising one or more modifications or a new requirement and provided until the validation is received to; and
   implementing, by the task management system, the one of the one or more action sequences based on the validation.

2. The method as claimed in claim 1, wherein the user input data is at least one of a voice input data or a text input data.

3. The method as claimed in claim 1, wherein the extracting the one or more requirements from the user input data comprises:
   capturing one or more task-specific keywords from the user input data;
   mapping each of the one or more task-specific keywords with one or more predetermined action frames for identifying missing information in the user input data; and
   prompting for providing the missing information.

4. The method as claimed in claim 1, wherein the integrating each of the plurality of resources is based on one or more parameters including a predetermined reference integration design, historical data related to similar tasks, metadata associated with one or more software modules and one or more hardware components, nature of input to the plurality of resources, or hypothetical analysis related to the task.

5. The method as claimed in claim 1, wherein the one of the one or more action sequences is selected based on predetermined factors.

6. The method as claimed in claim 1, wherein the user feedback comprises one or more modifications for the one of the one or more action sequences or an approval for implementing the one of the one or more action sequences.

7. The method as claimed in claim 6 further comprises incorporating each of the one or more modifications to the one of the one or more action sequences before implementing the one of the one or more action sequences.

8. A task management system for performing a task based on user input, the task management system comprising:
   a processor; and
   a memory, communicatively coupled to the processor, wherein the memory stores processor-executable instructions, which on execution cause the processor to:

extract by natural language processing one or more requirements from intent in user input data that corresponds to a task;

retrieve a plurality of resources comprising one or more software modules and one or more hardware components from a configuration repository required for performing the task based on the one or more requirements;

generate one or more action sequences for performing the task by integrating each of the one or more software modules and the one and more hardware components;

provide a simulated model, generated based on one of the one or more action sequences to validate the one of the one or more action sequences in a virtual environment, wherein the simulated model of the one of the one or more action sequences is regenerated in the virtual environment based on received user feedback data comprising one or more modifications or a new requirement and provided until the validation is received; and implement the one of the one or more action sequences based on the validation.

9. The task management system as claimed in claim 8, wherein the user input data is at least one of a voice input data or a text input data.

10. The task management system as claimed in claim 8, wherein for the extract the one or more requirements from the user input data, the instructions cause the processor to:

capture one or more task-specific keywords from the user input data;

map each of the one or more task-specific keywords with one or more predetermined action frames to identify missing information in the user input data; and prompt for providing the missing information.

11. The task management system as claimed in claim 8, wherein the processor integrates each of the plurality of resources based on one or more parameters including a predetermined reference integration design, historical data related to similar tasks, metadata associated with one or more software modules and one or more hardware components, nature of input to the plurality of resources, or hypothetical analysis related to the task.

12. The task management system as claimed in claim 8, wherein the processor selects the one of the one or more action sequences based on predetermined factors.

13. The task management system as claimed in claim 8, wherein the user feedback comprises one or more modifications to the one of the one or more action sequences or an approval for implementing the one of the one or more action sequences.

14. The task management system as claimed in claim 13, wherein the instructions further cause the processor to incorporate each of the one or more modifications to the one of the one or more action sequences before implementing the one of the one or more action sequences.

15. A non-transitory computer readable medium including instructions stored thereon that when processed by at least one processor causes a task management system to perform operations comprising:

extracting by natural language processing one or more requirements from intent in user input data that corresponds to a task;

retrieving a plurality of resources comprising one or more software modules and one or more hardware components from a configuration repository required for performing the task based on the one or more requirements;

generating one or more action sequences for performing the task by integrating each of the one or more software modules and the one and more hardware components;

providing a simulated model generated based on one of the one or more action sequences to validate the one of the one or more action sequences in a virtual environment, wherein the simulated model of the one of the one or more action sequences is regenerated in the virtual environment based on received user feedback data comprising one or more modifications or a new requirement and provided until the validation is received; and implementing the one of the one or more action sequences based on the validation.

* * * * *